(12) United States Patent
Matsukubo

(10) Patent No.: US 6,654,141 B1
(45) Date of Patent: Nov. 25, 2003

(54) IMAGE PROCESSING APPARATUS, IMAGE PROCESSING METHOD AND MEMORY MEDIUM

(75) Inventor: Yushi Matsukubo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/347,263

(22) Filed: Jul. 6, 1999

(30) Foreign Application Priority Data

Jul. 6, 1998 (JP) .......................................... 10-205912
Jun. 29, 1999 (JP) .......................................... 11-184091

(51) Int. Cl.$^7$ .............................................. G06F 15/00
(52) U.S. Cl. ........................ 358/1.2; 358/1.13; 347/15
(58) Field of Search ........................ 358/1.2, 1.5, 1.16, 358/1.13, 298, 300, 501, 512, 532, 334; 382/217, 299, 300, 301; 347/11, 15

(56) References Cited

U.S. PATENT DOCUMENTS 5,521,990 A * 5/1996 Shizawa et al. ............ 382/270

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

An image processing apparatus is provided that is capable, in case of forming a color image based on color image data entered from an external device, of improving the print quality by smoothing the contour of the printed character or pattern. In consideration of the reproducibility of the printer, a character or a fine line not exceeding a predetermined density is printed with a lowered resolving power. Also the reproduced density is selected between the average of the interpolating density or the original density. As a result, in case of outputting a multi-value image composed of a character or a pattern giving emphasis on the resolving power, the multi-value smoothing interpolation can be executed according to the density of the character, thereby smoothing the contour of such character or pattern and improving the print quality.

21 Claims, 10 Drawing Sheets

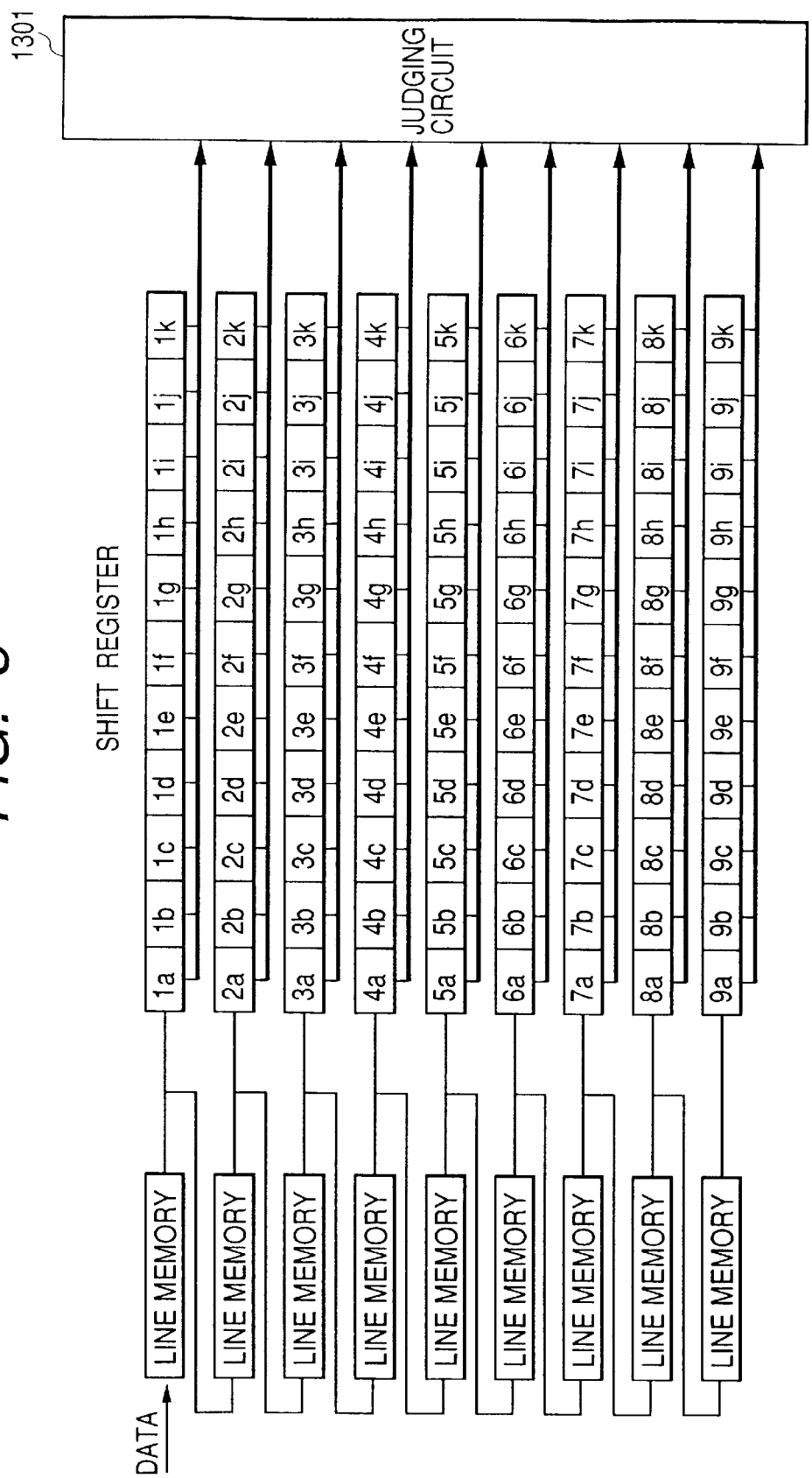

IMAGE PROCESSING APPARATUS, IMAGE PROCESSING METHOD AND MEMORY MEDIUM

BACKGROUND OF THE INVENTION

1. Field of the Invention

The present invention relates to an image processing apparatus, and image processing method and a memory medium.

2. Related Background Art

Conventionally there is known a color copying apparatus capable of printing bit map data representing characters or patterns, outputted from a computer or the like.

In such color copying apparatus, the general resolving power (resolution) for a character is currently 400 dip (dot/inch), so that the dots are printed with a pitch of 63.5 $\mu$m. On the other hand, there is being proposed a technology of printing a character with 800 dpi in order to increase the resolving power.

On the other hand, in case of printing a character or a fine line utilizing the color copying apparatus as a printer, there are contained various densities. Therefore, even if a character or a line image is detected by pattern matching and the detected edge of the character or line is uniformly interpolated with the doubled resolving power and with the multi-value density in order to cancel the jagged appearance generated by rasterizing on such edge, the reproducibility in the low density range is insufficient for the lines of a high resolving power because of the characteristics of the printer.

More specifically, in case the image data of a low density area are dispersed into fine plural pixels by interpolation and are printed with the doubled resolving power, there may result drawbacks such as the printed area being invisible or a blurred edge because the pixels are small and of a low density.

Also the output characteristics of the printer are different for the printing with 400 dpi and that with 800 dpi.

Also the linearity between the input density and the output density may be degraded by the change with the lapse of time.

FIG. 11 is a chart showing the relationship between the input density and the output density at different resolving powers of 400 and 800 dpi.

Comparison of 400 and 800 dpi in FIG. 11 indicates that the resolution of 400 dpi is closer to the ideal density characteristics in almost all the density levels.

In consideration of the foregoing, it is not desirable to increase the resolving power depending on the density of the image.

SUMMARY OF THE INVENTION

In consideration of the foregoing, an object of the present invention is to provide an image processing apparatus, an image processing method and a memory medium therefor, allowing to effect image formation with optimum resolving power and density according to the density of the image data.

Another object of the present invention is to provide an image processing apparatus, an image processing method and a memory medium therefor capable, in case of forming a color image based on color image data input from an external device, of smoothing the contour of the printed character or pattern and also selecting the optimum resolving power and density according to the output density thereby improving the print quality.

The above-mentioned objects can be attained, according to a preferred embodiment of the present invention, by an image processing apparatus comprising:

an input unit for inputting image data;

a judging unit for judging whether the image data represent a line image area;

a conversion unit for converting the resolving power by executing an interpolation process to the image data;

comparing means for comparing the image data, obtained by the conversion unit, with a specific density; and control means for selecting whether to record the image data with a first resolving power or with a second resolving power higher than the second resolving power, according to a result obtained by the judging unit and a result obtained by the comparing unit.

Still another object of the present invention is to provide an image processing apparatus, an image processing method and a memory medium therefor, provided with a novel function.

Still other objects of the present invention will become fully available from the following detailed description of the embodiments, to be taken in conjunction with the attached drawings.

BRIEF DESCRIPTION OF THE DRAWINGS

FIG. 8 is a block diagram showing a pattern matching circuit in the foregoing embodiment;

FIGS. 9A and 9B are views showing the algorithm in the foregoing embodiments for extracting the feature and discriminating whether the dot pattern is to be smoothed;

DETAILED DESCRIPTION OF THE PREFERRED EMBODIMENTS

First Embodiment

Figure 2:
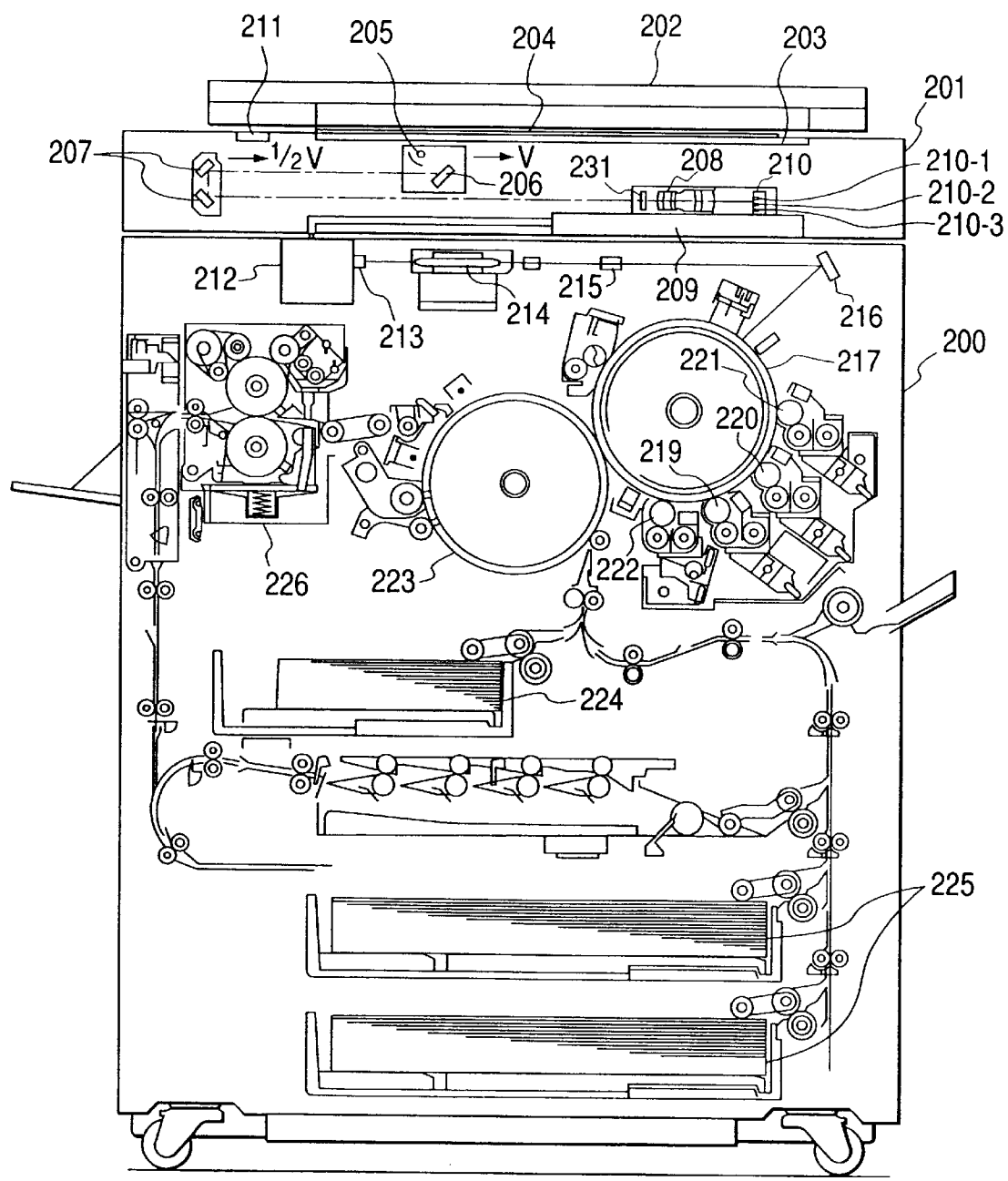
FIG. 2 is a cross-sectional view showing the internal structure of a color copying apparatus embodying the present invention.

FIG. 2 is a cross-sectional view showing the internal structure of a color copying apparatus constituting a first embodiment of the present invention.

Referring to FIG. 2, an image scanner unit 201 reads an original and executes digital signal processing, while an image scanner unit 200 prints, on a sheet, a full-color image corresponding to the original image read by the image scanner 201.

In the image scanner 201, an original pressure plate 202 presses an original 204 to an original table glass (platen) 203, and the original 204 on the platen 203 is illuminated by the light from a halogen lamp 205.

The light reflected from the original 204 is guided by mirrors 206, 207 and is focused by a lens 208 onto a 3-line sensor (CCD) 210. The lens 208 is provided with an infrared cut-off filter 231. The CCD 210 executes color separation of the light information from the original to obtain red (R), green (G) and blue (B) information for supply to a signal processing unit 209.

Each sensor array of the CCD 210, for reading each color component, is composed of 5000 pixels. Thus the shorter side of a length of 297 mm of the A3-sized original, which is the largest original size acceptable on the platen 203, can be read with a resolving power of 400 dpi.

The halogen lamp 205 and the mirror 206 are mechanically moved with a velocity v while the mirror 207 is mechanically moved with a velocity v/2 in a direction (sub scanning direction) perpendicular to the electrical (main) scanning direction of the line sensor to scan the entire surface of the original.

A standard white board 211 is used for correcting the data read by the R, G, B sensors 210-1 to 210-3. The standard white board 211 has a substantially uniform reflection characteristics in the visible wavelength region, thus showing white color under the visible light. The standard white board 211 is used for correcting the output data of the visible sensors 210-1 to 210-3.

The image signal processing unit 209 electrically processes the read signals to obtain component signals of magenta (M), cyan (C), yellow (Y) and black (Bk) which are sent to the printer unit 202.

In one original scanning operation of the image scanner 201, one of the components M, C, Y and Bk is transmitted to the printer unit 202, so that a print out is completed by four original scanning operations in total.

The M, C, Y, Bk image signals transmitted from the image scanner 201 are transferred to a laser driver 212, which modulates a semiconductor laser 213 according to the image signal. The emitted laser beam scans a photosensitive drum 217 through a polygon mirror 214 and an f-θ lens.

A developing device 219 to 222 is composed of a magenta developing unit 219, a cyan developing unit 220, a yellow developing unit 221 and a black developing unit 222, which in turn come into contact with the photosensitive drum 217 to develop M, C, Y and Bk electrostatic latent images, formed on the photosensitive drum 217 with toners of corresponding colors.

A sheet fed from a sheet cassette 224 or 225 is wound on a transfer drum 223, and the toner image developed on the photosensitive drum 217 is transferred onto the sheet. After the transfers of the M, C, Y and Bk color images in succession, the sheet is discharged through a fixing unit 226.

In the following there will be given a detailed explanation on the image scanner 201.

Figure 3A:
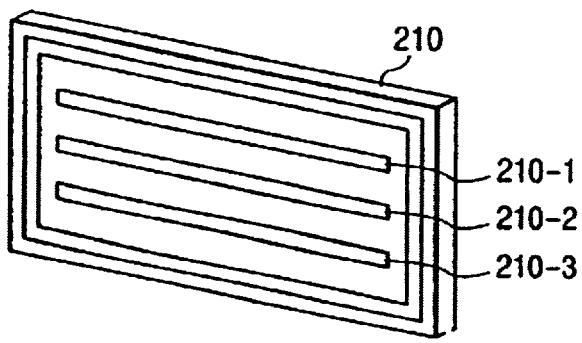
FIGS. 3A, 3B and 3C are views showing the configuration of a CCD employed in the above-mentioned embodiment.

FIG. 3A is a perspective view showing the configuration of the CCD 210 employed in the present embodiment.

There are provided photosensor arrays 210-1, 210-2, 210-3 for respectively reading the components or red (R) light, green (G) light and blue (B) light.

Each of the R, G, B sensors 210-1 to 210-3 is provided with apertures of 10 μm in the main and sub scanning directions. The three photosensor arrays of different optical characteristics are monolithically formed on a same silicon chip in mutually parallel manner so as that the R, G and B sensors read the same line of the original.

The CCD of the above-described configuration allows to employ a common optical system, including the lens, for separate reading of the different colors, thereby simplifying the optical adjustments for the R, G and B colors.

Figure 3C:
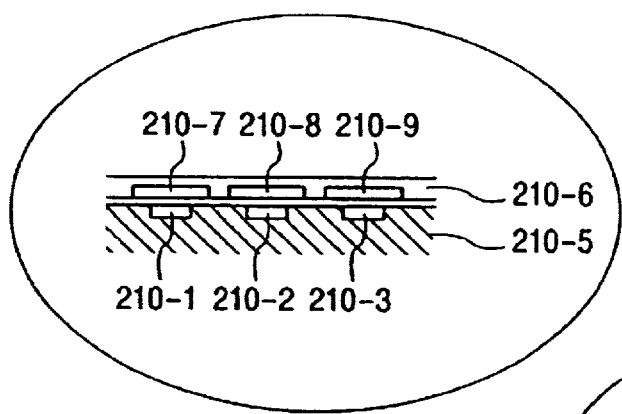

FIG. 3C is a cross-sectional view along a broken line in FIG. 3A.

On a silicon substrate 210-5 there are provided photosensors 210-1 for R color reading, 210-2 for G color reading and 210-3 for B color reading.

On the R photosensor 210-1 there is provided a R filter 210-7 for transmitting the read wavelength region within the visible light. Similarly the G and B photosensors 210-2, 210-3 are respectively provided thereon with a G filer 210-8 and a B filter 210-9. There is also provided a planarization layer 210-6 composed of a transparent organic film.

Figure 3B:
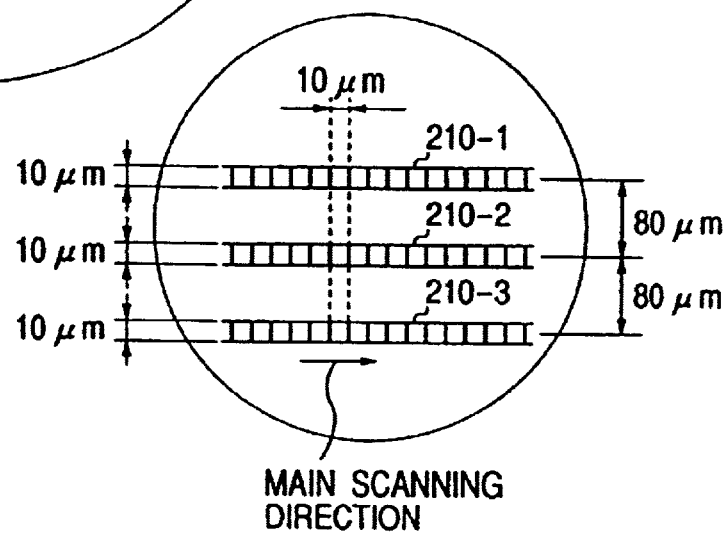

FIG. 3B is a magnified elevation view of the photosensors.

Each photosensor has a length of 10 μm per pixel in the main scanning direction. Each photosensor array has 5000 pixels in the main scanning direction, in order to read the shorter side (297 mm) of the A3-sized original with a resolving power of 400 dpi.

The R, G and B photosensor arrays are mutually separated by a distance of 80 μm, corresponding to 8 lines in the sub scanning resolving power of 400 dpi.

In the following there will be explained the method of density reproduction in the printer.

In the present embodiment, the turn-on time of the laser 213 is controlled by pulse width modulation (PWM) according to the image density signal, in order to reproduce the image density in the printer. On the photosensitive drum 217, there is thus formed at electrostatic latent image of a potential corresponding to the turn-one time of the laser. The latent image is developed with toner of an amount corresponding to the potential of the latent image, whereby the density of the original image is reproduced.

Figure 4:
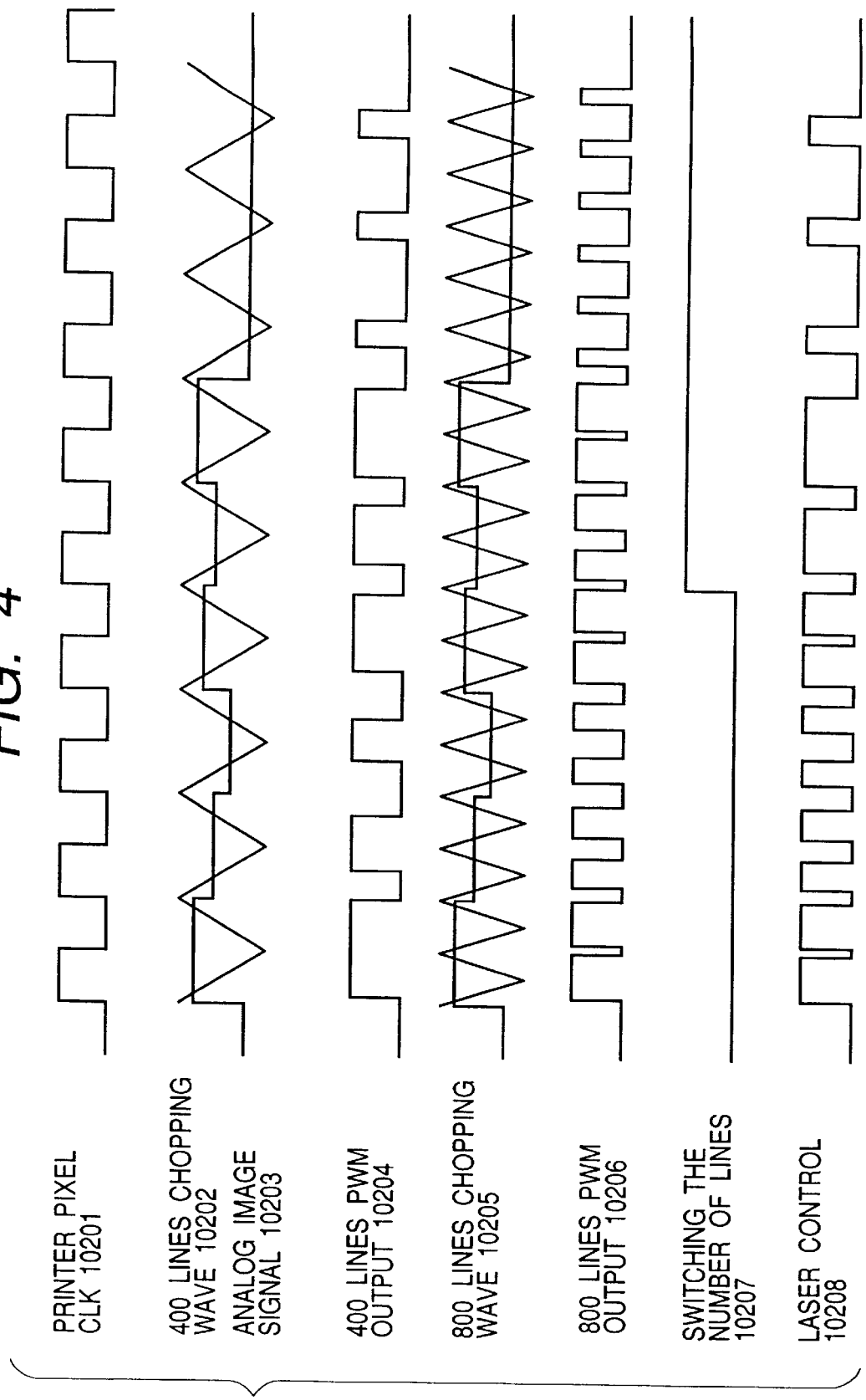
FIG. 4 is a timing chart showing the control function for density reproduction in a printer in the above-mentioned embodiment.

FIG. 4 is a timing chart showing the control operations for the density reproduction in the printer of the present embodiment.

A printer pixel clock signal (CLK) 10201 corresponds to the resolving power of 400 dpi and is generated by the laser driver 212. In synchronization with the printer pixel clock 10201, there is formed a triangular wave 10202 of 400 lines, having a cycle time same as that of the pixel clock 10201.

The M, C, Y, Bk image data having a resolution of 400 dpi and 256 (8-bit) density levels, from the image processing unit 209, and a 400 line/800 line switching signal are transmitted in synchronization with the clock signal and are synchronized with the printer pixel clock 10201 by an unrepresented FIFO memory in the laser driver 212.

The 8-bit digital image data are converted by a D/A converter into an analog image signal 10203, which is then compared in analog manner with the aforementioned 400-line triangular wave 10202 to generate a 400-line PWM output signal 10204. The digital pixel data vary from OOH to FFH, thus generating a corresponding pulse width in the 400-line PWM output signal 10204. The cycle time of the 400-line PWM output signal corresponds to a length of 63.5 μm of the photosensitive drum.

The laser driver 212 prepares, in addition to the 400-line triangular wave, an 800-line triangular wave 10205 of the doubled frequency, in synchronization with the printer pixel clock signal 10201. The analog image signal 10203 of 400 dpi is compared with the 800-line triangular wave 10205 to generate an 800-line PWM output signal 10206.

The 800-line PWM output signal 10206 form a latent on the photosensitive drum with a cycle time corresponding to 31.75 μm. The gradation reproducibility with 400 lines is better than that with 800 lines, because the minimum unit for the density reproduction with 400 lines is 63.5 μm which is twice of that with 800 lines.

On the other hand, the 800-line recording, reproducing the density with the unit of 31.75 μm, is suitable for image recording with a high resolving power. The PWM recording of 400 lines is suitable for reproducing the gradation while that of 800 lines is suitable for the high-resolution image recording, so that the PWM recording is switched between 400 and 800 lines according to the property of the image.

For this purpose there is employed a 400 line/800 line switching signal 10207, which is supplied from the image processing unit 209 to the laser driver in the unit of each pixel, in synchronization with the image signal of 400 dpi. The PWM output of 800 or 400 lines is selected respectively in case the 400 line/800 line switching signal is at the L- or H-level.

Figure 1:
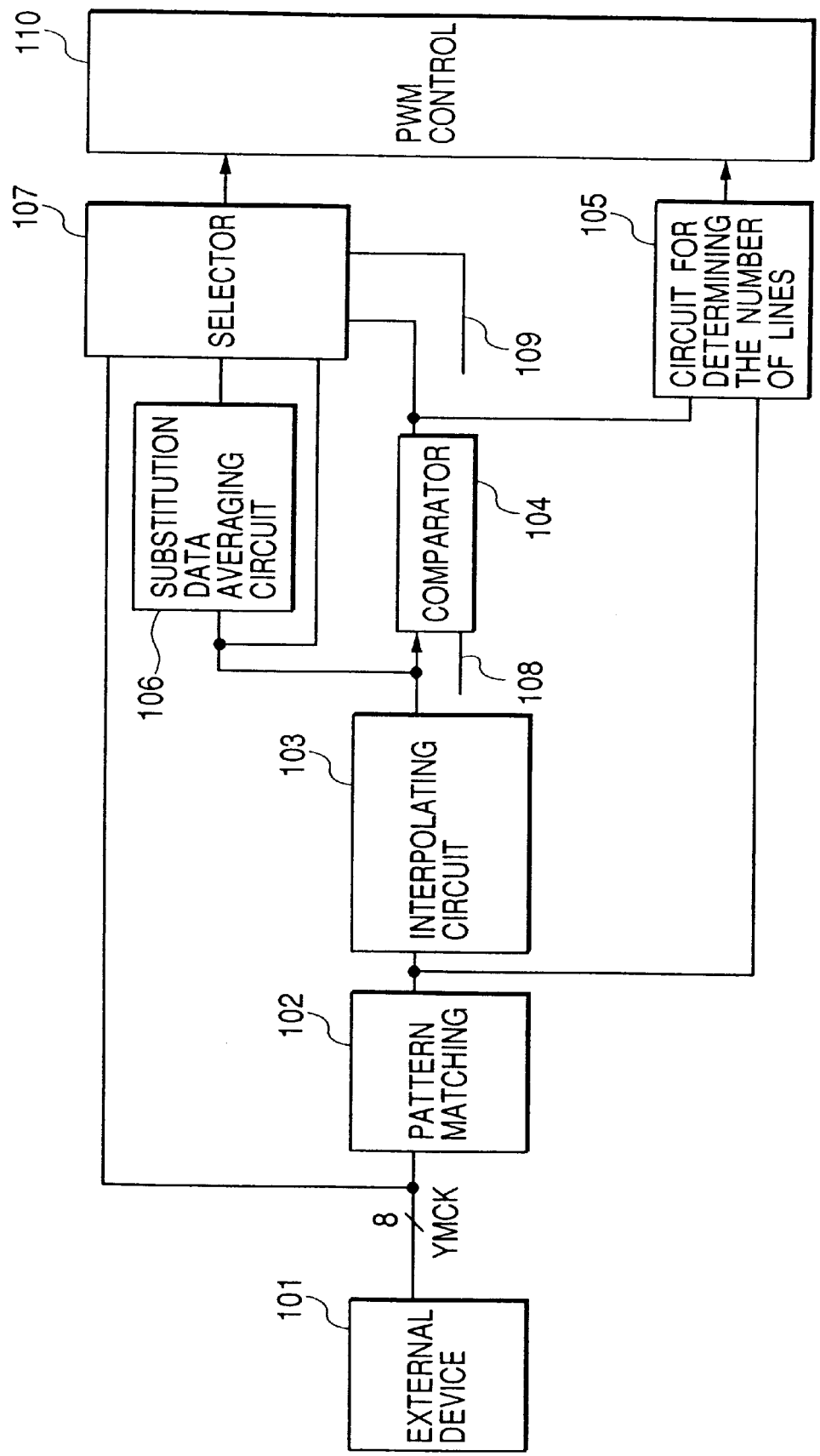
FIG. 1 is a block diagram showing the configuration of a control system of a color copying apparatus constituting a first embodiment of the present invention.

FIG. 1 is a block diagram showing the configuration of the control system in the first embodiment. A full-color image signal outputted from an external device 101 is binarized in a pattern matching circuit 102 and is subjected therein to pattern matching for discriminating whether the image signal is a character or a fine line. Then an interpolation circuit 103 prepares the interpolation data by referring to the density data of the surrounding pixels and generating output density data after substitution with a resolving power equal to twice of that of the input data. The resolving power is not limited to twice but can be any other multiple capable of increasing the resolving power.

Then a comparator 104 compares the density after substitution with the predetermined density data (input 108), and releases an output "1" in case the former is higher. In case the output of the comparator 104 is "1" and the pattern matching identifies a character or a fine line, the image is considered as a character or a fine line of a high density and a line number determination circuit 105 generates a line number signal for 800 lines. If the output of the comparator 104 is "0", even when the pattern matching identifies a character or a fine line, the image is considered as a character or a fine line of a low density so that line number determination circuit 105 generates a line number signal for 400 lines.

Also in case the output of the comparator 104 is "0", a selector 107 selects either the density data of 400 dpi generated in a substitution data averaging circuit 106 or original data from the external device 101.

The above-mentioned selector 107 switches the resolving power, by the instruction of the user, according to whether the density is in a region where the interpolation is effective even with the resolving power of 400 dpi.

This switching can be instructed from the operating display image of the printer driver of the external device (host computer) 101 and/or the operation unit of the color copying apparatus shown in FIG. 2.

The result of such instruction is supplied as a switching signal 109 to the selector 107.

The density data generated in the substitution data averaging circuit 106 enables printing with a half density, so that the contour of a character or a line can be smoothed.

On the other hand, in case the original image data are outputted from the selector 107, there can be printed a character or a line with sharp contour, though jagged appearance remains on the contour.

Figure 6:
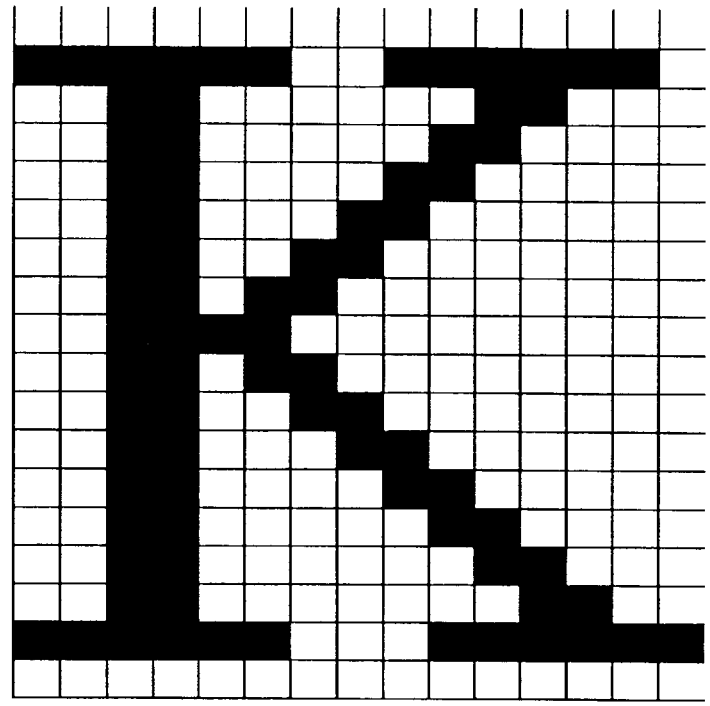
FIG. 6 is a view showing an example of the input image in the foregoing embodiment.
Figure 7:
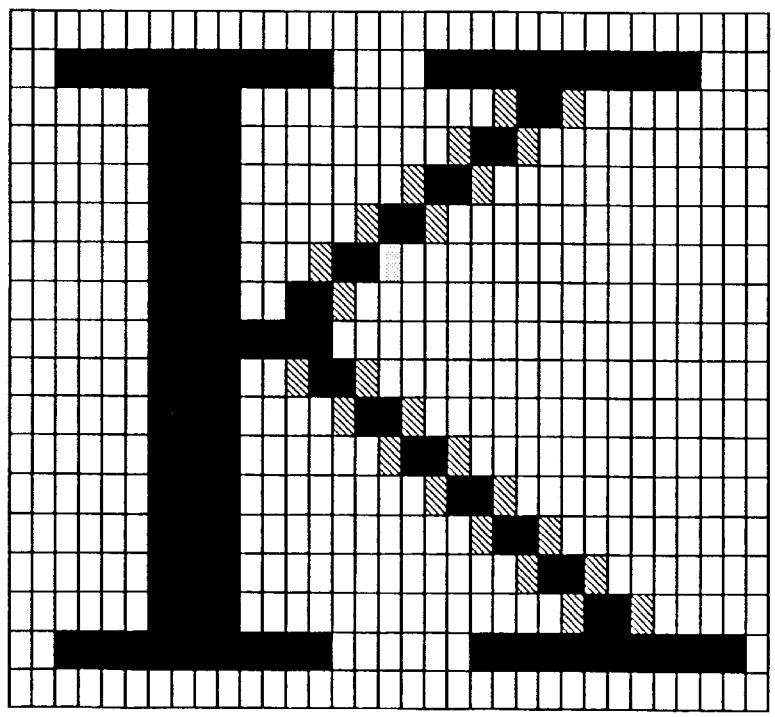
FIG. 7 is a view showing an image obtained by smoothing the input image shown in FIG. 6.

Then a PWM control unit 110 switches the resolving power according to the 400 line/800 line switching signal. FIG. 6 shows an example of the actual input image while FIG. 7 shows the result after smoothing.

In the following there will be explained the details of the above-described circuits. At first, FIG. 8 is a block diagram of the pattern matching circuit 102.

When the image signal of 400 dpi is transmitted from the controller to the printer in synchronization with the image clock signal, the image dot data are stored in succession in line memories 1 to 9, and, from the dot data in the line memories 1 to 9, dot matrix information of 11 dots in the main scanning direction and 9 dots in the sub scanning direction is extracted to shift registers 1 to 9 at the same time. Then a judging circuit 1301 detects the feature of the dot matrix information.

Figures 9A, 9B:
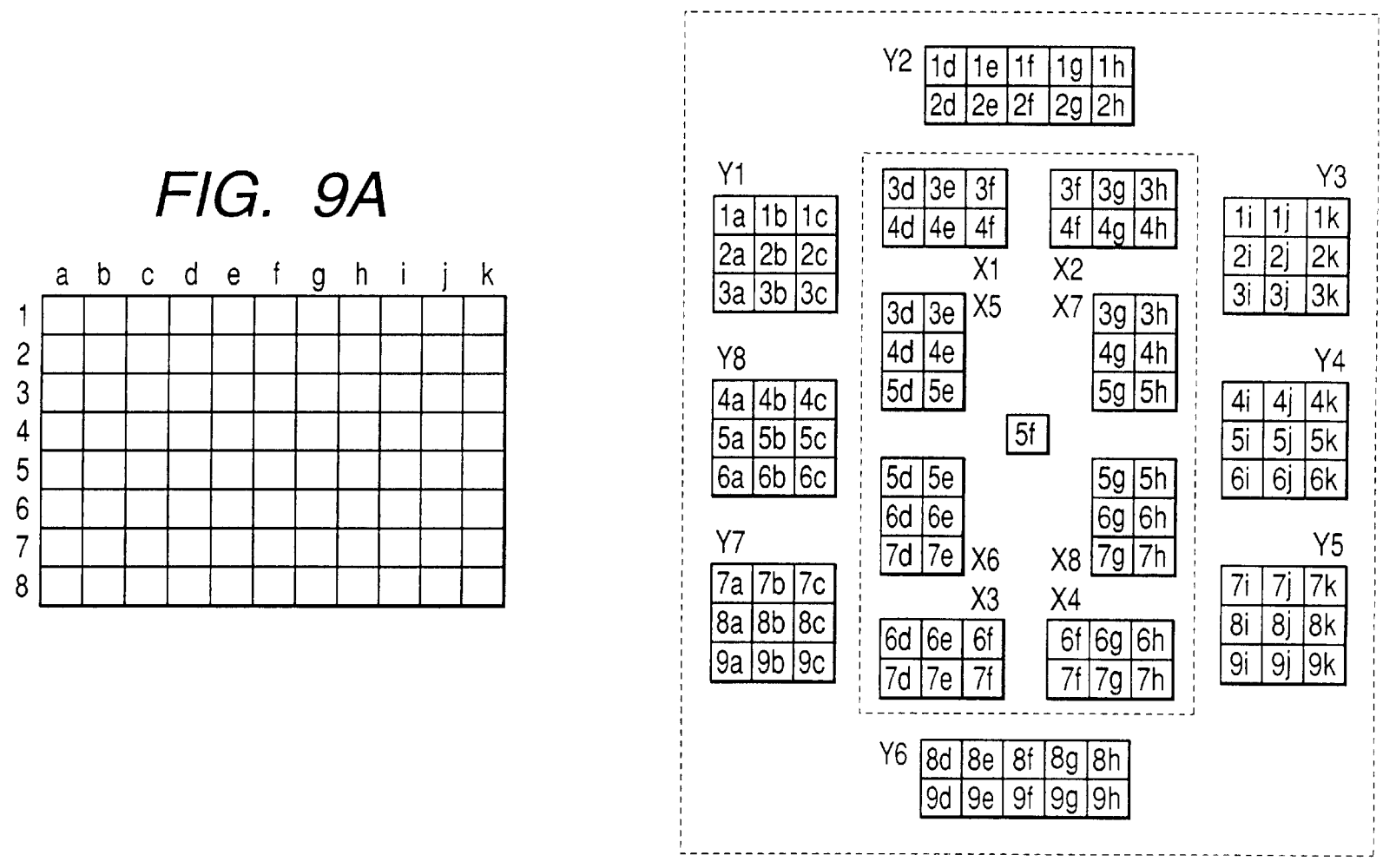

FIGS. 9A and 9B show the algorithm for extracting the feature of the dot pattern over the entire matrix area of 11 dots in the main scanning direction and 9 dots in the sub scanning direction, and judging whether the smoothing is to be executed on the dot pattern.

FIG. 9A shows the reference area of 11 dots in the main scanning direction and 9 dots in the sub scanning direction, containing 99 pixels in total arranged in a matrix of a, b, c, d, e, f, g, h, i, j and k in the main scanning direction and 1, 2, 3, 4, 5, 6, 7, 8 and 9 in the sub scanning direction. A center pixel is represented by 5f and is selected as the pixel for substitution for smoothing.

FIG. 9B shows the division of the reference area shown in FIG. 9A into 17 areas X1 to X3, Y1 to Y8 and 5f. For example, the area X1 is composed of pixels 3d, 3e, 3f, 4d, 4e and 4f; the area X2 is composed of pixels 3f, 3g, 3h, 4f, 4g and 4h; the area X3 is composed of pixels 6d, 6e, 6f, 7d, 7e and 7f; and other areas are similarly formed as illustrated.

Thus the above-mentioned reference area can be divided into eight 6-dot areas (X1 to X8), six 9-dot areas (Y1, Y3, Y4, Y5, Y7, Y8) and two 10-dot areas (Y2, Y6) and the center pixel 5f. The feature of each area is represented by Xn or Yn. The feature of each ares is defined as "0" in case all the dots in the area are same, but as "1" in case all the dots are not same. Thus there can be obtained features X1 to X8, Y1 to Y8 for the areas. The pattern matching is executed by at first judging X1 to X8 positioned close to the center pixel 5f, and, in case the center pixel 5f is considered possibly a part of a character or a line image, executing judgment on Y1 to Y8. Such configuration allows an easy judgment of the candidate for a character or a line image, and, in case the possibility of a character or a line image is high, a more detailed judgment can be executed employing the wider reference area.

The pattern determined by such pattern matching is substituted in an interpolation circuit 103 with two predetermined densities.

Figure 10:
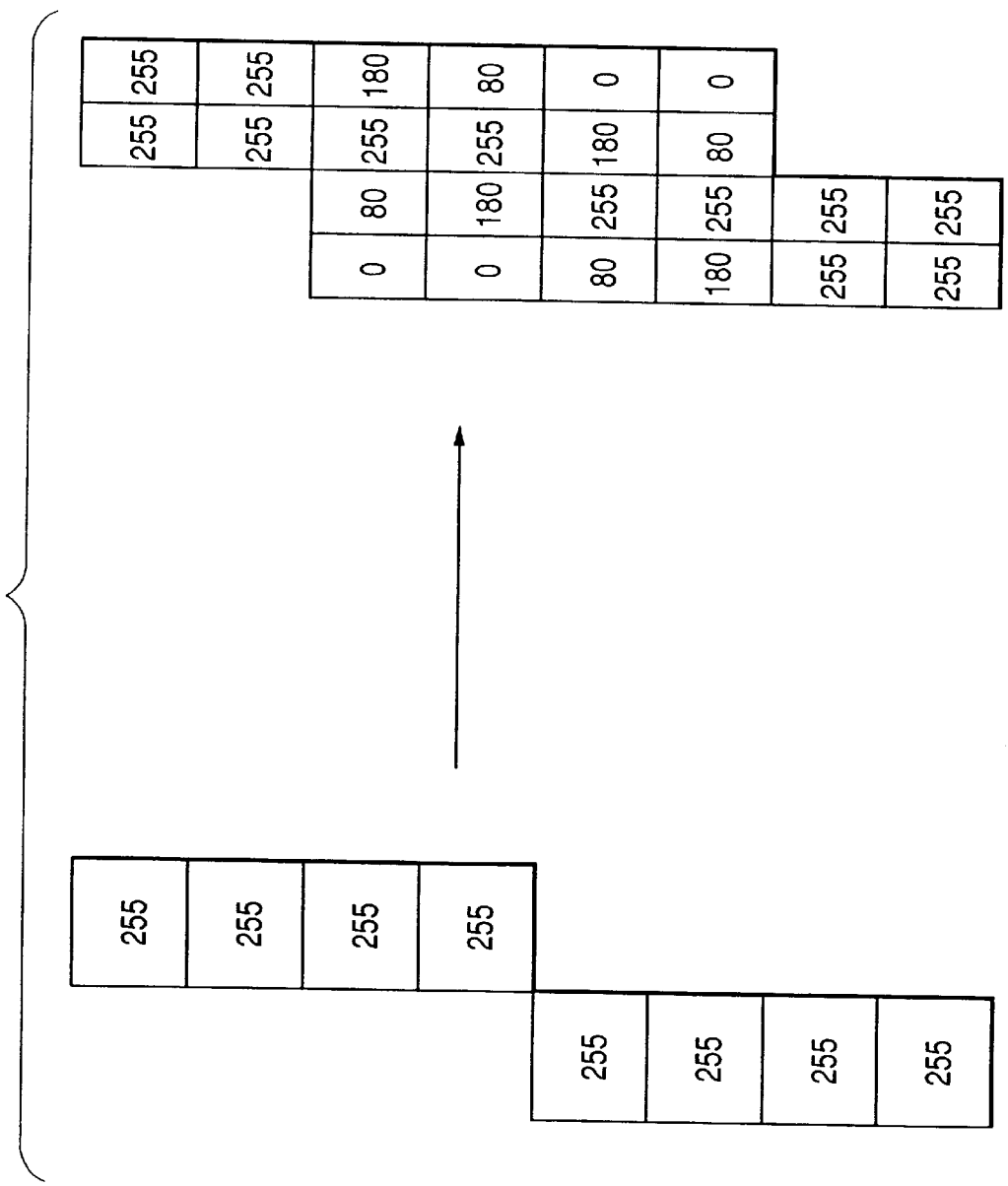
FIG. 10 is a view showing an example of smoothing in the foregoing embodiments.
Figure 11:
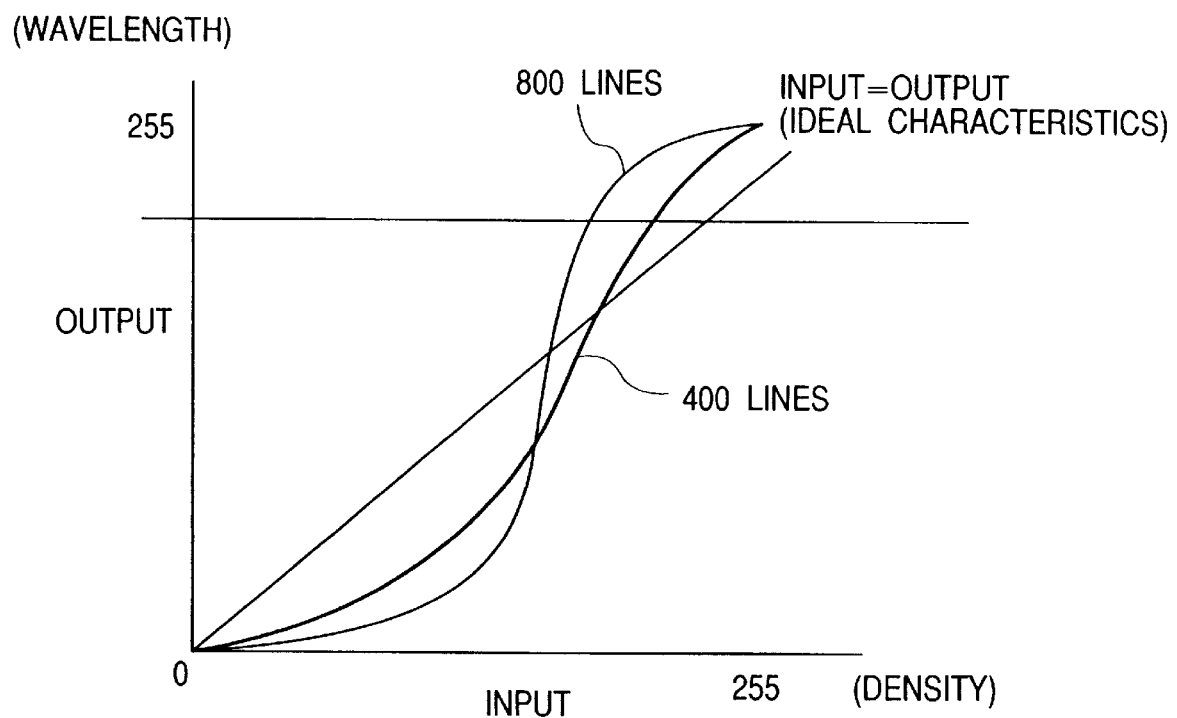
FIG. 11 is a chart showing the relationship between the input density and the output density of printer at different resolving powers.

FIG. 10 shows an example of smoothing of a rasterized line having a width of a pixel and a density level 255. As illustrated in FIG. 10, the interpolating data can be substituted with multi-value data according to the input pattern.

Second Embodiment

In the following there will be explained a second embodiment of the present invention.

In contrast to the foregoing first embodiment employing YMCK area-sequential input data, the second embodiment utilizes RGB area-sequential input data.

Figure 5:
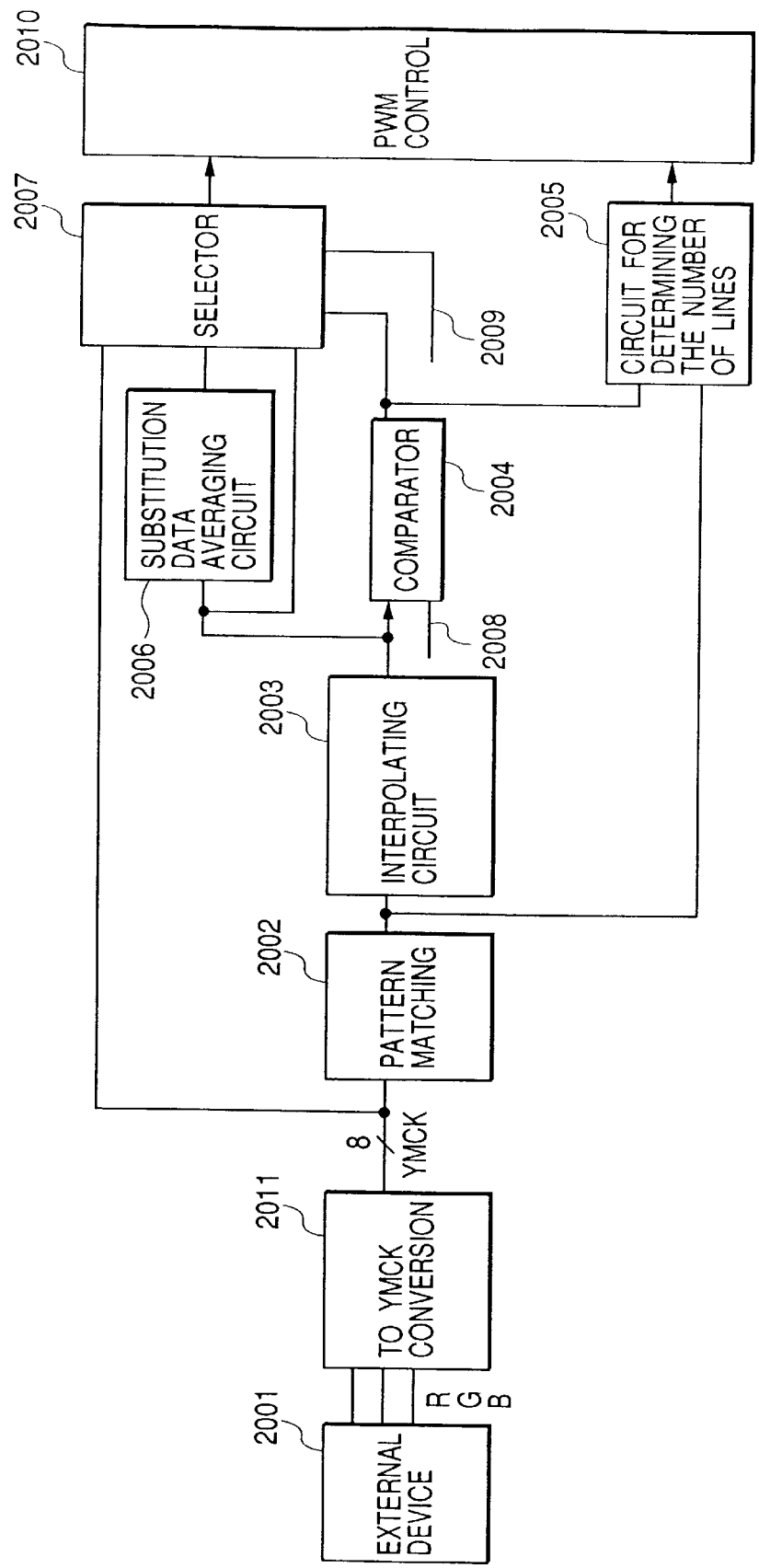
FIG. 5 is a block diagram showing the configuration of a control system of a color copying apparatus constituting a second embodiment of the present invention.

FIG. 5 is a block diagram showing the configuration of the control system in the second embodiment, of which feature will be explained in the following.

An RGB area-sequential image signal outputted from an external device 2001 is converted, in a luminance/density conversion circuit 2011, into a CMYK area-sequential signal corresponding to the colors reproduced on the printer. It is then binarized in a pattern matching circuit 2002 and is subjected to pattern matching for judging whether the signal indicates a character or a fine line. Then an interpolation circuit 2003 prepares the interpolation data by referring to the density data of the surrounding pixels and generating output density substitution data with a resolving power equal to twice of that of the input data. The resolving power is not limited to twice but can be any other multiple capable of increasing the resolving power.

Then a comparator 2004 compares the density after substitution with the predetermined density data (input 2008), and releases an output "1" in case the former is higher. In case the output of the comparator 2004 is "1" and the pattern matching identifies a character or a line image, the image is considered as a character or a fine line of high density and a line number determination circuit 2005 generates a line number signal for 800 lines. If the output of the comparator 2004 is "0", even when the pattern matching identifies a character or aline image, the image is considered as a character or a line image of a low density so that line number determination circuit 2005 generates a line number signal for 400 lines.

Also in case the output of the comparator 2004 is "0", a selector 2007 selects either the density data of 400 dpi generated in a substitution data averaging circuit 2006 or original data from the external device 2001.

The above-mentioned selector 2007 switches the resolving power, by the instruction of the user, according to whether the density is in a region where the interpolation is effective even with the resolving power of 400 dpi.

This switching can be instructed from the operating display image of the printer driver of the external device (host computer) 2001 and/or the operation unit of the color copying apparatus shown in FIG. 2.

The result of such instruction is supplied as a switching signal 2009 to the selector 2007.

The density data generated in the substitution data averaging circuit 2006 enables printing with a half density, so that the contour of a character or a line can be smoothed.

On the other hand, in case the original image data are outputted from the selector 2007, there can be printed a character or a line with sharp contour, though jagged appearance remains on the contour.

Then a PWM control unit 2010 switches the resolving power according to the 400 line/800 line switching signal. FIG. 6 shows an example of the actual input image while FIG. 7 shows the result after smoothing.

In the following there will be explained the details of the above-described circuits. At first, FIG. 8 is a block diagram of the pattern matching circuit 2002.

When the image signal of 400 dpi is transmitted from the controller to the printer in synchronization with the image clock signal, the image dot data are stored in succession in line memories 1 to 9, and, from the dot data in the line memories 1 to 9, dot matrix information of 11 dots in the main scanning direction and 9 dots in the sub scanning direction is extracted to shift registers 1 to 9 at the same time. Then a judging circuit 1301 detects the feature of the dot matrix information.

FIGS. 9A and 9B show the algorithm for extracting the feature of the dot pattern over the entire matrix area of 11 dots in the main scanning direction and 9 dots in the sub scanning direction, and judging whether the smoothing is to be executed on the dot pattern.

FIG. 9A shows the reference area of 11 dots in the main scanning direction and 9 dots in the sub scanning direction, containing 99 pixels in total arranged in a matrix of a, b, c, d, e, f, g, h, i, j and k in the main scanning direction and 1, 2, 3, 4, 5, 6, 7, 8 and 9 in the sub scanning direction. A center pixel is represented by 5f and is selected as the pixel for substitution for smoothing.

FIG. 9B shows the division of the reference area shown in FIG. 9A into 17 areas X1 to X3, Y1 to Y8 and 5f. For example the area X1 is composed of pixels 3d, 3e, 3f, 4d, 4e and 4f; the area X2 is composed of pixels 3f, 3g, 3h, 4f, 4g and 4h; the area X3 is composed of pixels 6d, 6e, 6f, 7d, 7e and 7f; and other areas are similarly formed as illustrated.

Thus the above-mentioned reference area can be divided into eight 6-dot areas (X1 to X8), six 9-dot areas (Y1, Y3, Y4, Y5, Y7, Y8) and two 10-dot areas (Y2, Y6) and the center pixel 5f. The feature of each area is represented by Xn or Yn.

The feature of each area is defined as "0" in case all the dots in the area are same, but as "1" in case all the dots are not same. Thus there can be obtained features X1 to X8, Y1 to Y8 for the areas.

The pattern determined by such pattern matching is substituted in a smoothing circuit 2003 with two predetermined densities. FIG. 10 shows an example of smoothing of a rasterized line having a width of a pixel and a density level 255. As illustrated in FIG. 10, the interpolating data can be substituted with multi-value data according to the input pattern.

As explained in the foregoing, the above-described embodiments allow to provide a color copying apparatus capable, in outputting a multi-value image such as a character or a line image with emphasis in resolving power, of achieving a high gradation reproducibility and a high resolving power by executing a multi-value smoothing interpolation according to the density of such character or line image.

Other Embodiments of the Invention

A processing method of storing, in a memory medium, a program for operating the configuration of the foregoing embodiments so as to realize the functions thereof, reading the program stored in the memory medium as codes and realizing the foregoing embodiments by executing such program codes by a client computer or a server computer is also included in the foregoing embodiments, and the memory medium storing the aforementioned program is also included in the foregoing embodiments.

The memory medium storing such program codes can be, for example, a floppy disk, a hard disk, an optical disk, a magnetooptical disk, a CD-ROM, a magnetic tape, a non-volatile memory card or a ROM.

Furthermore, the foregoing method is not limited to the case where the process is executed solely by the program stored in the aforementioned memory medium but a case where the foregoing program functions on the operating system in cooperation with another software or a function expansion board to achieve the functions of the foregoing embodiments is also included in the foregoing embodiments.

What is claimed is:

1. An image processing apparatus comprising:

input means for inputting image data;

judgment means for judging whether the image data represent a line image area;

conversion means for converting a resolution by executing an interpolation process to the image data;

comparing means for comparing the image data, obtained by said conversion means with a predetermined density; and control means for changing whether to record the image data with a first resolution or with a second resolution higher than said first resolution, according to a result obtained by said judgment means and a result obtained by said comparing means.

2. An image processing apparatus according to claim 1, wherein said judgment means executes judgment by pattern matching.

3. An image processing apparatus according to claim 1, wherein the image data of the first resolution is data obtained by interpolating the image data input by said input means.

4. An image processing apparatus according to claim 1, wherein the recording by said control means with the first resolution is conducted with the image data input by said input means.

5. An image processing apparatus according to claim 1, wherein the recording by said control means with the first resolution is conducted with image data obtained by averaging the image data interpolated by said conversion means.

6. An image processing apparatus according to claim 1, wherein the recording by said control means with the first resolution is conducted, according to a selection by an operator, either with the image data input by said input means or with image data obtained by averaging the image data interpolated by said conversion means.

7. An image processing apparatus according to claim 6, wherein said selection is instructed by an operation unit of said image processing apparatus.

8. An image processing apparatus according to claim 6, wherein the selection is instructed by a host computer connected to said input means.

9. An image processing apparatus according to claim 2, wherein said pattern matching is executed by effecting judgment referring to a peripheral pixel positioned around a pixel subjected to judgment, and when the pixel subjected to judgment is judged to be a part of a line image, by effecting judgment referring to pixels of an area wider than the peripheral pixel.

10. An image processing apparatus comprising:

line image judgment means for judging whether image data represent a line image area;

density judging means for judging, based on the image data, whether the density of an object pixel does not exceed a predetermined density; and control means for selecting either recording of the image of a first resolution obtained by executing an interpolation process to the image data or recording of the image of a second resolution, lower than the first resolution, obtained by averaging the image data obtained by said interpolation, according to a result obtained by said line image judgment means and a result obtained by said density judging means.

11. An image processing apparatus comprising:

line image judgment means for judging whether image data represent a line image area;

density judging means for judging, based on the image data, whether the density of an object pixel does not exceed a predetermined density; and control means for selecting either recording of the image of a first resolution obtained by executing an interpolation process to the image data or recording of the image of a second resolution, lower than the first resolution, prior to the execution of the interpolation process, according to a result obtained by said line image judgment means and a result obtained by said density judging means.

12. An image processing apparatus according to claim 10, wherein said judging means executes judgment by pattern matching.

13. An image processing apparatus according to claim 10, wherein the image data of the first resolution is data obtained by interpolating the image data input by said input means.

14. An image processing apparatus according to claim 11, wherein said judging means executes judgment by pattern matching.

15. An image processing apparatus according to claim 11, wherein the image data of the first resolution is data obtained by interpolating the image data input by said input means.

16. An image processing method comprising the steps of:

inputting image data;

judging whether the image data represent a line image area;

converting the resolution by executing an interpolation process to the image data;

comparing the image data, obtained by said converting step, with a predetermined density; and changing whether to record the image data with a first resolution or with a second resolution higher than the first resolution, according to a result obtained in said judging step and a result obtained in said comparing step.

17. An image processing method comprising:

judging whether image data represent a line image area;

judging, based on the image data, whether the density of an object pixel does not exceed a predetermined density; and changing either recording of the image of a first resolution obtained by executing an interpolation process to the image data or recording of the image of a second resolution, lower than the first resolution, prior to the execution of the interpolation process, according to a result obtained in said line image judging step and a result obtained in said density judging step.

18. An image processing method according to claim 17, wherein said judging step includes executing judgment by pattern matching.

19. A computer readable memory medium storing a program for executing an image processing method, said program comprising the steps of:

inputting image data;

judging whether the image data represent a line image area;

converting a resolution by executing an interpolation process to the image data;

comparing the image data, obtained by said converting step, with a predetermined density; and changing whether to record the image data with a first resolution or with a second resolution higher than the first resolution, according to a result obtained in said judging step and a result obtained in said comparing step.

20. A computer readable memory medium storing a program for executing an image processing method, said program comprising the steps of:

judging whether image data represent a line image area;

judging, based on the image data, whether the density of an object pixel does not exceed a predetermined density; and changing either recording of the image of a first resolution obtained by executing an interpolation process to the image data or recording of the image of a second resolution, lower than the first resolution, prior to the execution of the interpolation process, according to a result obtained in said line image judging step and a result obtained in said density judging step.

21. A computer readable memory medium storing a program for executing an image processing method according to claim 20, wherein said judging step includes executing judgment by pattern matching.

* * * * *

UNITED STATES PATENT AND TRADEMARK OFFICE
CERTIFICATE OF CORRECTION

PATENT NO.     : 6,654,141 B1
DATED          : November 25, 2003
INVENTOR(S)    : Yushi Matsukubo Page 1 of 1

It is certified that error appears in the above-identified patent and that said Letters Patent is hereby corrected as shown below:

Column 1,
Line 17, "400 dip" should read -- 400 dpi --.

Column 2,
Line 5, "apparatus-comprising:" should read -- apparatus comprising: --.

Column 3,
Line 42, "print-out" should read -- printout --.

Column 4,
Line 19, "G filer 210-8" should read -- G filter 210-8 --;
Line 41, "at" should read -- an --.

Column 6,
Line 48, "ares" should read -- area --.

Column 7,
Line 33, "aline" should read -- a line --.

Column 9,
Line 15, "means" should read -- means, --.

Signed and Sealed this

Fifteenth Day of June, 2004

JON W. DUDAS
*Acting Director of the United States Patent and Trademark Office*